United States Patent Office 2,952,605
Patented Sept. 13, 1960

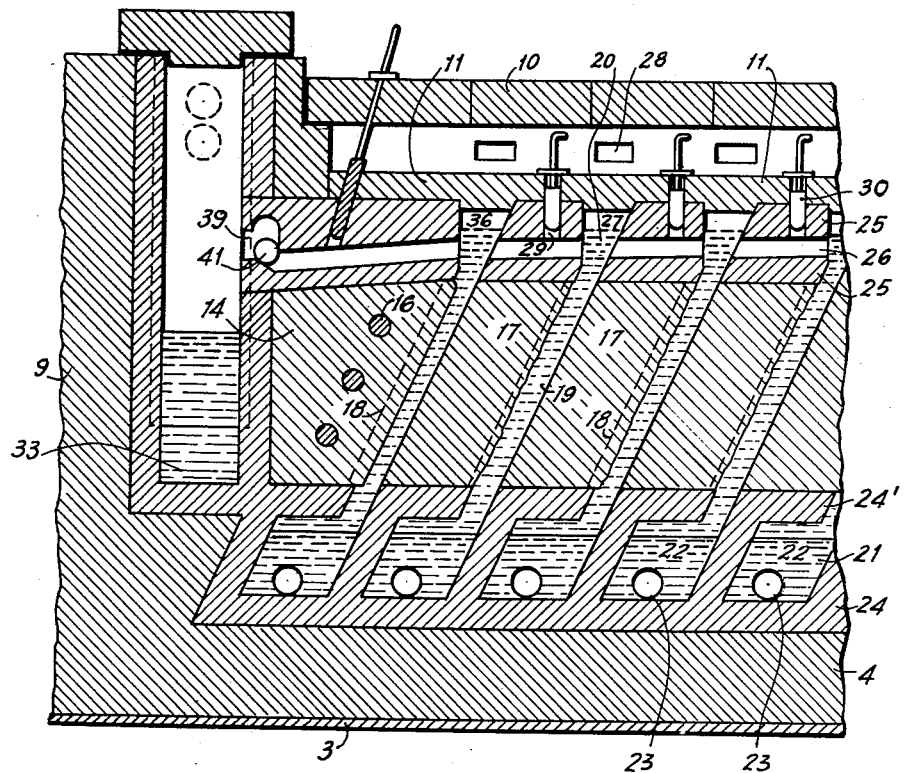

2,952,605
REFRACTORIES RESISTANT TO AGGRESSIVE MELTS AND TREATMENT FOR OBTAINING THEM

Giuseppe de Varda, Milan, Italy, assignor to Montecatini Società Generale per l'Industria Mineraria e Chimica, a corporation of Italy Filed Dec. 26, 1957, Ser. No. 705,374
Claims priority, application Italy Dec. 29, 1956
15 Claims. (Cl. 204—243)

This invention relates to processes for rendering refractories, such as magnesium oxide, impermeable to fluorine compounds, such as cryolite, at high temperatures, preferably without reducing their electrical resistivity to a value below that of the resistivity of the fused aggressive electrolytic baths containing them. It further relates to the products of such processes, and to electrolytic furnaces, or other apparatus, employing the improved refractories in the form of linings, conduits, joints, bricks, or other elements.

In constructing electrolysis cells for producing metallic aluminum from aluminum oxide dissolved in fused fluorinated salts, of the type described, for example, in De Varda U.S. application Serial No. 587,985, filed May 29, 1956, the quality of the material employed for the lining of the cell has constituted a problem not solved in an entirely satisfactory manner heretofore.

The material heretofore proposed and employed has been obtained from magnesite. Essentially it comprises magnesium oxide pre-treated at very high temperatures and transformed subsequently into refractory bricks or other shaped elements of required compactness. For example, it comprises magnesite fused and, or, sintered several times.

The materials must resist, at temperatures of 900° to 1000° C., the aggressive action of the fluorinated bath. Moreover, the shaped elements and bricks and, if needed, joints formed thereof, should constitute an impermeable barrier against the passage of the fused bath and should have low electric conductivity, possibly not higher than 1 mho per cubic centimeter.

In lieu of searching for an extraordinary new material possessing all of the required characteristics, it has been found, surprisingly, that certain types of magnesite refractories already available in the trade can be improved by a convenient treatment, so that their characteristics fulfill the requirements.

The drawing illustrates the use of the improved refractory to form linings, conduits, and other elements of a furnace employed for electrolysis of aluminum oxide in a bath of molten cryolite.

Before describing the invention it is desirable to further explain the problem involved.

Experiments have been carried out with magnesite of Austrian origin (Radenthein). The refractory bricks had the following characteristics:

| | |
|---|---|
| MgO content | 90 to 91%. |
| Apparent density | About 3 g./cc. |
| Porosity | About 18 to 20%. |
| Open pores | About 15 to 16%. |
| Electric resistivity at 20° C. | $140 \times 10^6$ Ω/cc. |
| Electric resistivity at 1000° C. | $70 \times 10^4$ Ω/cc. |

Said material was found to be permeable to water in the cold and permeable to cryolitic baths in the warm.

A simple and commonly used method to stop the penetration of corrosive baths into the walls of the cells is to freeze said baths after causing them to penetrate into said walls. Cryolitic baths freeze at temperatures between 850° and 900° ordinarily, according to their composition. The thermal stop or barrier so provided has the inconvenient property of causing greater heat dissipation from the cell, and also an increase in electric energy consumption. Moreover, the refractory layer, of considerable thickness, not so sealed remained soaked with liquid bath, the corrosive and destructive action of which upon the refractory and binder was persistent in time or duration. This is made more severe by the enormous surface available for attack. Thus, first deformation and then disintegration of the refractory ensues.

On the other hand, in such electrolytic cells it is not possible to substitute for the MgO refractories a layer of graphite or of an anthracitic mass, or of carbon agglomerates in blocks, or of Söderberg paste etc., although such inert materials are commonly used in cells for electrolytic aluminium production, in horizontal layers. All these carbon agglomerates are comparatively good conductors of electricity, and they would therefore by-pass, through the side walls, the electric current destined for the electrolysis.

The above inconveniences are eliminated wholly, or in great part, by the invention.

It has been found possible to render the refractory layer forming the cell lining practically impermeable, by subjecting said layer to one or more treatments with impregnating and cokifiable substances, namely, to successive impregnations with fluid pitch, alternated with cokifying heat treatments. This cycle of steps is repeated about two to five times.

The open holes of the refractory layer, comprising bricks, shaped elements and joints, are thus progressively filled, or at least clogged, against the passage of the bath by means of subdivided coke particles. The latter prevent the fused bath from entering the pores of the brick and, therefore, avoid its deleterious aggressive action which would eventually spoil the brick. Surprisingly, said cokified particles do not impart to the refractory bricks any electric conductivity characteristics beyond the above-mentioned critical limit, since the pores are not eliminated but fractionated or divided into smaller and smaller pores, and reduced to dimensions which are uniform, in practice.

The process may be carried out as follows:

The refractory brick or refractory layer, including joints if any, is impregnated with pitch, preferably with hard pitch, that is pitch having an elevated softening point (for instance, 70 Kramer Sarnow degrees). The pitch is fluidized at a temperature of 200 to 220° C. for a time sufficient to ensure penetration of the pitch into the brick to the desired depth. The time of treatment may vary from a few minutes to some hours or more. After carrying out this impregnation, the electrolytic cell is emptied of pitch and the temperature of the cell is brought gradually, preferably in the absence of air, to about 600° C., so that the pitch that has remained adherent to the surface of the walls, or absorbed thereby, is slowly and at least for a great part cokified. Said second operation may be carried out in few hours or in various days. Thereafter, the cell is cooled down and the inner walls are preferably cleaned to take away the adherent coke layer formed thereon. Said operation is not indispensable but facilitates the subsequent impregnating treatment. However, the external layer can be detached fairly easily from the refractory wall since said layer is of rather brittle carbonaceous material.

Thereafter the individual steps of the cycle may be repeated as described with the sole difference that the quantity of pitch absorbed decreases rapidly with every successive treatment.

Usually three to five impregnations with pitch are fully sufficient to ensure for the brick an almost complete impermeability to the cryolitic bath and, therefore, a fairly strong chemical resistance.

In the above experiments, hard pitch (K.S. 70°) has been employed prevailingly, but satisfactory results can also be obtained by employing soft pitch (K.S. 45°) fluidized at 180–200° C. Such soft pitch when absorbed yields 35–45% in cokification, whereas the hard pitch yields about 60%, or more.

Generally speaking, the present invention may satisfactorily employ any carbonaceous substance containing a considerable percentage of cokifiable hydrocarbons, and meeting the following requirements:

(a) Low cost;
(b) Satisfactory yield in cokification;
(c) Negligible decomposition at melting temperature, or, rather, at fluidizing temperature;
(d) Comparatively low surface tension;
(e) Good "wetting" of the refractory;
(f) Inertness to the refractory and to its binder.

Usually the fluid pitch, penetrating from the interior of the cell into the refractory walls confining the latter, fills nearly the totality of the open holes of said walls, having a very high impregnating effect. After discharging the excess of non-absorbed pitch from the cell, the cell is heated gradually up to 600° C., whereby the pitch decomposes and so cokifies to great extent. Although coke has an absolute specific gravity much higher than fluid pitch, nevertheless it apparently has a pore-filling action not much smaller than that of a quantity of fluid pitch of analogous weight.

By successive treatments of impregnation and cokification, a coke content in the interior of the refractory has been attained that varies from 4 to 5% by weight of the refractory, and may even surpass that limit.

The low electric conductivity of a magnesite refractory so treated is surprising. The product has fairly high resistivity, especially as compared with the resistivity of carbonaceous masses of the prebaked carbon electrode, baked Söderberg paste, graphite electrode types, etc. The resistivity of the latter carbonaceous masses is of the order of $6 \times 10^{-3}$ Ω/cm.$^3$.

The resistivity of refractory bricks not treated is, as is well known, very high, as indicated above.

MgO bricks impregnated with hard pitch and subsequently cokified at 1000° C. in the manner described above, have shown resistivities of between 1.15 and 2.15 ohm/cc., with a coke residue in the brick of the order of 2.6 to 2.7%. Said values diminish with the increasing percentage of coke contained but they increase if the impregnation zones are limited to the peripheral zones of the brick only.

Of course the resistivity data indicated above relate to impregnated refractories from which the coke layer adhering to the external surfaces of the refractory has been removed mechanically after termination of cokification.

In the following examples, tests one and two are for comparison. Tests three and four illustrate the invention.

Test 1

To ascertain the attack, in course of time, by the cryolitic bath that has penetrated and stays in the interior of a refractory wall, there were carried out tests on MgO parallelepiped refractory non-impermeabilized samples having an average size of 30 x 25 x 65 mm., an average volume of 50 cc., and an average weight of 150 g. The weight of the bath used, comprising cryolite with 5% of $Al_2O_3$, was about 350 g., the temperature was kept between 980° and 1000° C., which is sensibly above the operating temperature in electrolysis cells for aluminum production. After 45 days, the magnesite samples displayed a volumetric variation of +8% and a weight variation of −4%. Quantitative analysis of said samples showed a MgO loss of 57 g. and an increase of $Al_2O_3$ content by 48 g. and of $F_2$ content by about 10 g. Said alterations were fairly rapid in the first ten days while in the subsequent 35 days they occurred at a slower rate, that is, at approximately 3/5 in the first ten days and 2/5 in the subsequent 35 days. It has been found that in the zones of contact between individual MgO grains, there takes place, especially in the interior of the samples, a slow phenomenon of spinellization of the grains with at least partial double exchange between the Mg of the grain and the Al of the cryolite.

Test 2

The following experiments illustrate the behaviour of non-impermeabilized magnesite with respect to the penetration of fluorinated baths:

(a) A magnesite (MgO) bowl of inner diameter 70 mm., depth 40 mm., external height 65 mm., having an external square base with a 110 mm. side, was filled with cryolite bath, containing 10% of alumina, at a temperature of 950–960° C. A subsequent addition of bath was made after the first two hours, as soon as the bowl appeared empty. After 8 hours from the start of the experiment, the bowl was substantially empty and part of the bath had passed through the bowl into the chamber of the heating furnace. The speed of lowering of the bath level in the bowl diminished gradually from 12 mm. to about 5 mm. per hour. However, it should be borne in mind also that there is bath consumption by evaporation.

(b) The same experiment if conducted with cryolite at 1010° C. shows lowering of the level inside the bowl by 30 mm. in 20 minutes only, probably owing to formation of a crack at the bottom of the bowl. After the experiment, the bowl showed an increase of weight by nearly 9%, from which one should assume that about 90% of the open pores have been filled with cryolite.

(c) The experiment was repeated with a round bowl of 110 mm. external diameter. All the other dimensions were identical to those of the experiments 2(a) and 2(b). The experiment was conducted with cryolite at 1010° C. Here the flow was slower, initially 21 mm. lowering of level per hour in the first 55 minutes, then 12 mm./hr. in the subsequent 15 minutes. The bowl when filled again with cryolite then became empty in only 14 minutes. A subsequent addition of bath (90% of cryolite and 10% of $Al_2O_3$) disappeared in two minutes, confirming the porous structure (or the presence of possible cracks) of the bowl at the end of the test. At any rate it is possible to conclude that on increasing the temperature of the bath or cryolite at contact with the bowl by 50° C. (from 950° to 1000° C.), for instance, the effects of penetration and corrosion increase according to an exponential law. The increase of weight found in the bowl at the termination of the test was about 7%.

Test 3.—Impermeabilization

From refractory magnesite bricks having the characteristics indicated above, there have been obtained cylinders 65 cm. high and having external diameter of 110 mm., made concentrically hollow inside so as to obtain in every cylinder a receptacle with vertical walls, 40 mm. deep, of 70 mm. internal diameter. These bowls were repeatedly impregnated with hard pitch (K.S. 70°) for from 3 to 6 hours at temperatures between 200–220° C. The cokification, instead, was conducted gradually in a time of 9 hours at 600° C., prolonging the heat treatment for one further hour at that temperature and operating in nitrogen atmosphere.

The following table reports the weights measured at the beginning and at the end of the individual operating stages.

|  | a | b |
|---|---|---|
| Initial Weight of Bowl_____g_ | 1,341 | 1,306 |
| Weight after the first impregnation with hard pitch of K.S. 70° for 6 hours at 200–220° C_____g_ | 1,412 | 1,371 |
| Weight after the first cokification to 600° C_____g_ | 1,378 | 1,340 |
| Weight after the second impregnation with pitch for 3 hours_____g_ | 1,410 | 1,370 |
| Weight after the second cokification to 600° C_____g_ | 1,394 | 1,352 |
| Weight after the third impregnation with pitch for 3 hours_g_ | 1,405 | 1,365 |
| Weight after the third cokification to 600° C_____g_ | 1,400 | 1,361 |
| 1st Impregnation pitch absorbed_____percent_ | 5.3 | 4.7 |
| 1st Baking total carbon left_____do___ | 2.75 | 2.6 |
| 2nd Impregnation pitch absorbed_____do___ | 2.4 | 2.3 |
| 2nd Baking total carbon left_____do___ | 3.95 | 3.5 |
| 3rd Impregnation pitch absorbed_____do___ | 0.8 | 1.0 |
| 3rd Baking total carbon left_____do___ | 4.4 | 4.2 |

Test 4.—Testing impermeabilization

The behaviour of bowls impermeabilized with pitch and subsequently placed in contact with fused baths is described as follows:

(a) A bowl of refractory magnesite material, having dimensions analogous to those of the tests 2(c) and 3, and previously impregnated three times with hard pitch (K.S. 70°) and baked after every impregnation (weight of coke content 4.2%) was treated for about 220 minutes with fused bath originally composed of 90% cryolite and 10% $Al_2O_3$ at a temperature of 950–960° C. in the absence of atmospheric oxygen. To this bath fused metallic aluminium was also added subsequently. For the bowl so tested an increase of weight of 5 g., that is, of 0.4%, with respect to its initial weight of 1365 g. was ascertained.

(b) Another bowl, of dimensions analogous to that of test 4(a), impregnated once with soft pitch (K.S. 45°) and twice with hard pitch (K.S. 70°) with respective baking stages at 600° C. (weight of coke content 3.5%) was treated with a fused bath of identical composition, with subsequent additions of fused Al, analogous to the preceding test, again at the temperature of 950–960° C. for 185 minutes.

At the end of the test, the weight of the empty bowl proved to have increased by 12 g. (i.e. by 0.8%) with respect to an initial weight of 1508 g.

(c) Another bowl, of dimensions analogous to those of bowl 4(a), previously impregnated twice with hard pitch (K.S. 70°), with respective baking stages at 600° C. (weight of coke content 4.0%), was treated in two distinct stages with fused bath of identical composition (with subsequent addition of fused Al) and in a manner analogous to that of the preceding test, again at the temperature of 950–960° C. for about 650 minutes, the two distinct stages being conducted at some weeks' interval from each other.

|  | 1st stage | 2nd stage |
|---|---|---|
| Duration_____minutes__ | 247_____ | 405. |
| Initial weight of cold bowl_____g__ | 1,430_____ | 1,435. |
| Weight of cold bowl at end of respective operating stage_____g__ | 1,435_____ | 1,430. |
| Variation of weight_____g__ | +5_____ | −5. |
| Bath absorbed_____percent__ | About 0.4__ | Presumably about 0.2. |
| Coke contained in the refractory_____g__ | 55_____ | Presumably about 48. |

It should be noted that in the last 45 minutes of the second stage air had penetrated into the furnace owing to a failure, which air oxidized a fraction of the coke contained in the refractory.

By the above processes, an MgO refractory containing 1 to 6% by weight of subdivided coke and having an electrical resistivity higher than 1 ohm/cm.² is readily obtainable.

As stated above, the drawing illustrates an industrial application of the product, employed for lining of furnaces used for electrolyzing a molten bath of metal or metal salts. The structural details of this apparatus are to be found in my copending application Serial No. 587,985 mentioned above.

The alumina-cryolite bath is indicated at 20, the molten aluminum produced, and collected below, being shown at 21. The inclined anodic surfaces 18 of the electrodes face downwardly. Embedded electric conductors are shown at 16. The molten bath overflows or circulates from one cell to the next through ducts 26 in refractory blocks 25 fitting upon the tops of the bi-polar electrodes 17 and terminal electrode 14. Chamber 33 receives the circulating molten bath liquid through a port 39 controlled by a valve 41. Blocks 25, ducts 26, and liner 24, for insulating material 4 and 9, are made of the refractory produced by the present invention. Plugs 30 are employed to seal off the adjacent passages 26 when a cell is to be removed from operation. Gases are discharged through vents 28 in a chamber formed between cover plates 10 and inner plates 11. At 3 is the outer metal sheathing for the furnace.

The invention can obviously employ silicon nitride, bonded silicon carbide and other high-grade refractories too, as well as other commercially available lower grade refractory materials, contacting aggressive fluids, in high temperature furnaces also having other technological applications.

I claim:

1. A furnace for producing aluminum by electrolysis of a molten bath comprising alumina in molten cryolite, said furnace comprising electrode members forming a cell and a structural element contacting the molten bath liquid, said element being essentially comprised of magnesium oxide refractory material the susceptibility to attack and the porosity of which has been substantially decreased by cokified pitch present in the pores thereof, the inner bath-contacting free surface of the cokified refractory material being substantially free of cokified carbonaceous material, to prevent detrimental reduction thereby of the electrical resistivity of the element, the electrical resistivity of the cokified refractory being higher than about 1 ohm per cubic centimeter, the cokified refractory region containing in its pores from 1 to 6% by weight of subdivided coke.

2. A furnace for producing aluminum by electrolysis of a molten bath comprising alumina in molten cryolite, said furnace comprising electrode members forming a cell and a structural element contacting the molten bath liquid, said element being essentially comprised of a magnesium containing refractory material the porosity of which has been substantially decreased by a deposit of cokified pitch in the pores thereof, the inner bath-contacting free surface of the cokified refractory material being substantially free of the cokified carbonaceous material, to prevent detrimental reduction thereby of the electrical resistivity of the element.

3. A furnace for producing aluminum by electrolysis of a molten bath comprising alumina in a molten salt, said furnace comprising electrode members forming a cell and a structural element contacting the molten bath liquid, said element being essentially comprised of an electrically resistive magnesium oxide refractory material having a deposit of cokified carbonaceous material in the pores thereof to decrease its penetrability by the molten bath.

4. A process for substantially reducing the porosity and attackability of a magnesium oxide refractory on contact with an aggressive liquid comprising a molten halogen compound, characterized in that the refractory is impregnated with a cokifiable organic substance comprising fused pitch, the refractory so impregnated being subjected to subsequent cokifying heat treatment.

5. The process defined in claim 4, the cycle comprising impregnating and subsequent cokifying being repeated a number of times.

6. The process defined in claim 5, the cokification being carried out in the substantial absence of atmospheric oxygen.

7. A process for substantially reducing the porosity and attackability of a magnesium oxide refractory on contact with an aggressive liquid comprising a molten halogen compound, characterized in that the refractory is impregnated with a cokifiable organic substance comprising fused pitch, the refractory so impregnated being subjected to subsequent cokifying heat treatment, the fused pitch being a hard pitch and being at a temperature between 200° and 220° C., and the subsequent step of cokification being at a temperature of at least 600° C., the operating cycle of steps being repeated from 2 to 5 times.

8. A process for reducing substantially the porosity and attackability of a magnesium oxide refractory on contact with an aggressive liquid, characterized in that, prior to the contact with said liquid, the refractory is contacted with an inert liquid diluent that wets the refractory and contains a cokifiable organic substance, the refractory so contacted being subjected to subsequent cokifying heat treatment, the contacting with the inert liquid lasting from several minutes to several hours while operating at a temperature lower than the temperature of sensible decomposition of the inert liquid, the duration of the subsequent cokifying treatment varying from several hours to several days.

9. A process for reducing strongly the porosity and attackability of a magnesium oxide refractory on contact with an aggressive liquid comprising a molten halogen compound, characterized in that prior to the contact with said liquid, the refractory is contacted with an inert liquid that wets the refractory and contains a cokifiable organic substance, the refractory so contacted being subjected to subsequent cokifying heat treatment at a temperature of at least 600° C., the operative cycle of contacting and cokifying steps being repeated at least twice.

10. A process for impermeabilizing an internal wall of a magnesium oxide refractory element destined to contact and to contain aggressive liquids, comprising the sequence of contacting the wall with fused pitch and subsequently subjecting the refractory to cokifying heat treatment, in which sequence the wall is previously heated, then said fused pitch is made to contact said heated wall, the excess of pitch that has not penetrated into said wall, and that does not adhere, is removed, the wall so treated is subjected to a prolonged heat treatment for cokification out of contact with atmospheric oxygen, and the adherent layer of coke formed on the surfaces of said wall which was in contact with the pitch being mechanically removed.

11. A magnesium oxide refractory having an electrical resistivity at least 100 times as great as that of graphite type semiconductors, said refractory having in its pores a deposit of cokified pitch to diminish its permeability.

12. A magnesium oxide refractory having in the pores of at least a barrier forming region thereof a deposit of subdivided coke to diminish its permeability to fluids, said region containing from 1 to 6% of the coke and having an electrical resistivity of at least 1 ohm/cm.$^3$.

13. A high temperature apparatus for processing a molten fluorine compound, said apparatus comprising a refractory element having a surface formed of magnesium oxide in contact with the molten material, said element having a peripheral zone limited in depth, and to the region beneath said surface, said zone having a deposit of cokified carbonaceous material in the pores thereof to decrease the penetrability of said zone by said molten material.

14. A process for reducing substantially the porosity and attackability of a magnesium oxide refractory on contact with an aggressive liquid fluorine compound, characterized in that, prior to the contact with said liquid, the refractory is contacted with an inert liquid that wets the refractory and contains a cokifiable organic substance, the refractory so contacted being subjected to subsequent cokifying heat treatment.

15. A process for impermeabilizing an internal wall of a refractory element formed of magnesium oxide destined to contact and to contain an aggressive liquid fluorine compound, comprsing the sequence of contacting the wall with an inert liquid comprising a cokifiable organic substance and subsequently subjecting the refractory to cokifying heat treatment, in which sequence the wall is previously heated to about the temperature of the inert impregnating liquid, then said inert liquid is made to contact said wall, the excess of inert liquid that has not penetrated into said wall, and that does not adhere, is removed, the wall so impregnated being subjected to a prolonged heat treatment for cokification out of contact with atmospheric oxygen, and the adherent layer of coke formed on the surface of said wall which was put in contact with the inert liquid being mechanically removed.

References Cited in the file of this patent

UNITED STATES PATENTS 2,407,868    Burke _____ Sept. 17, 1946